Sept. 3, 1968  G. B. GREENE  3,399,699
FLUID FLOW CONTROL VALVE
Filed Sept. 21, 1964
3 Sheets-Sheet 1
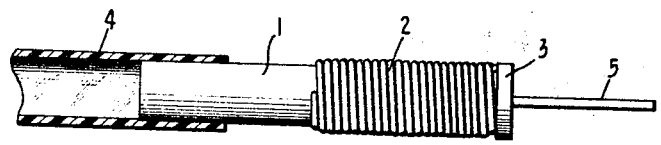
FIG_1
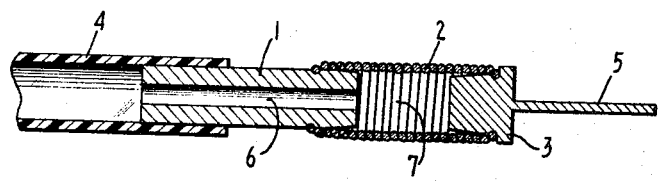
FIG_2
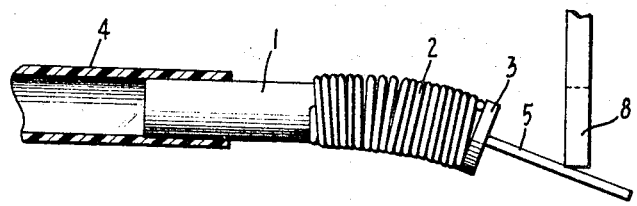
FIG_3
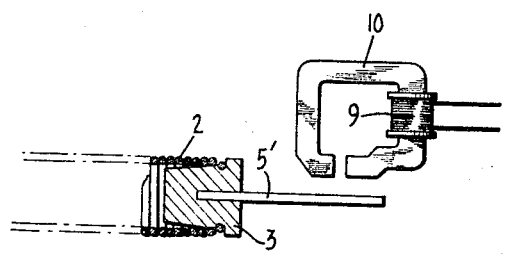
FIG_4
INVENTOR.
GEORGE B. GREENE
BY
ATTORNEY Sept. 3, 1968 G. B. GREENE 3,399,699
FLUID FLOW CONTROL VALVE
Filed Sept. 21, 1964 3 Sheets-Sheet 2
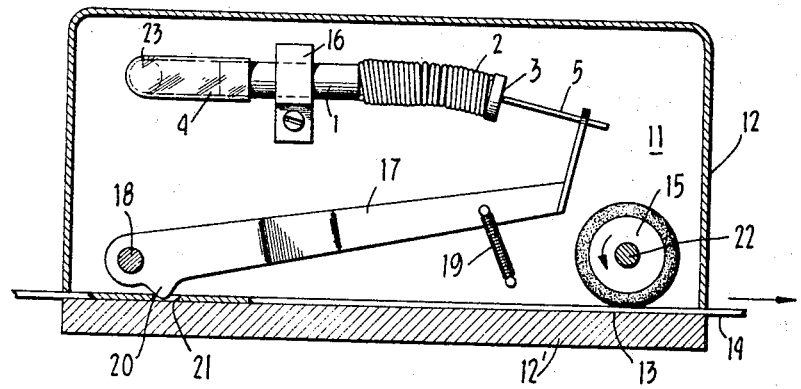
FIG_5
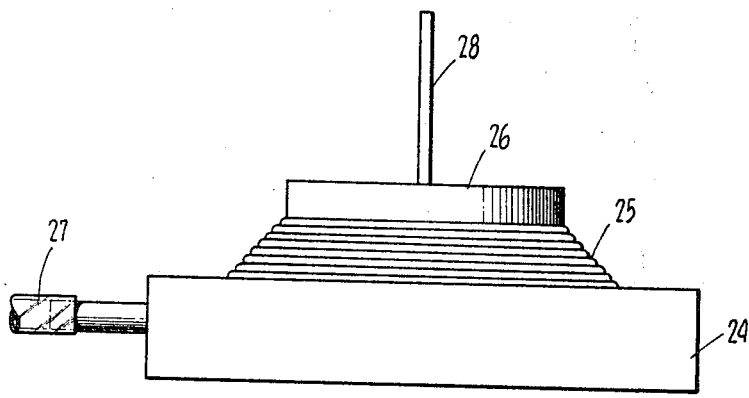
FIG_6
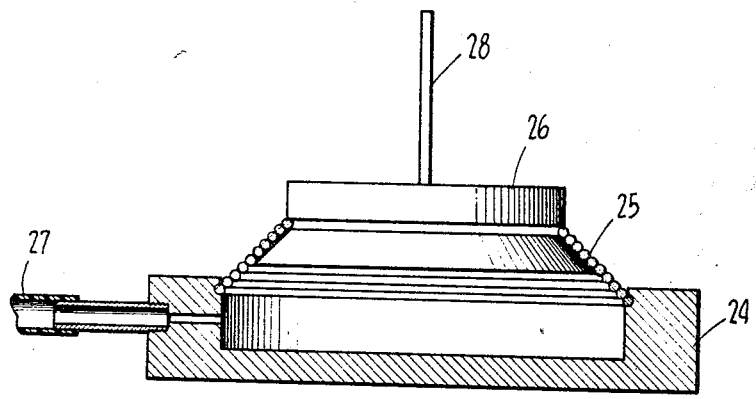
FIG_7

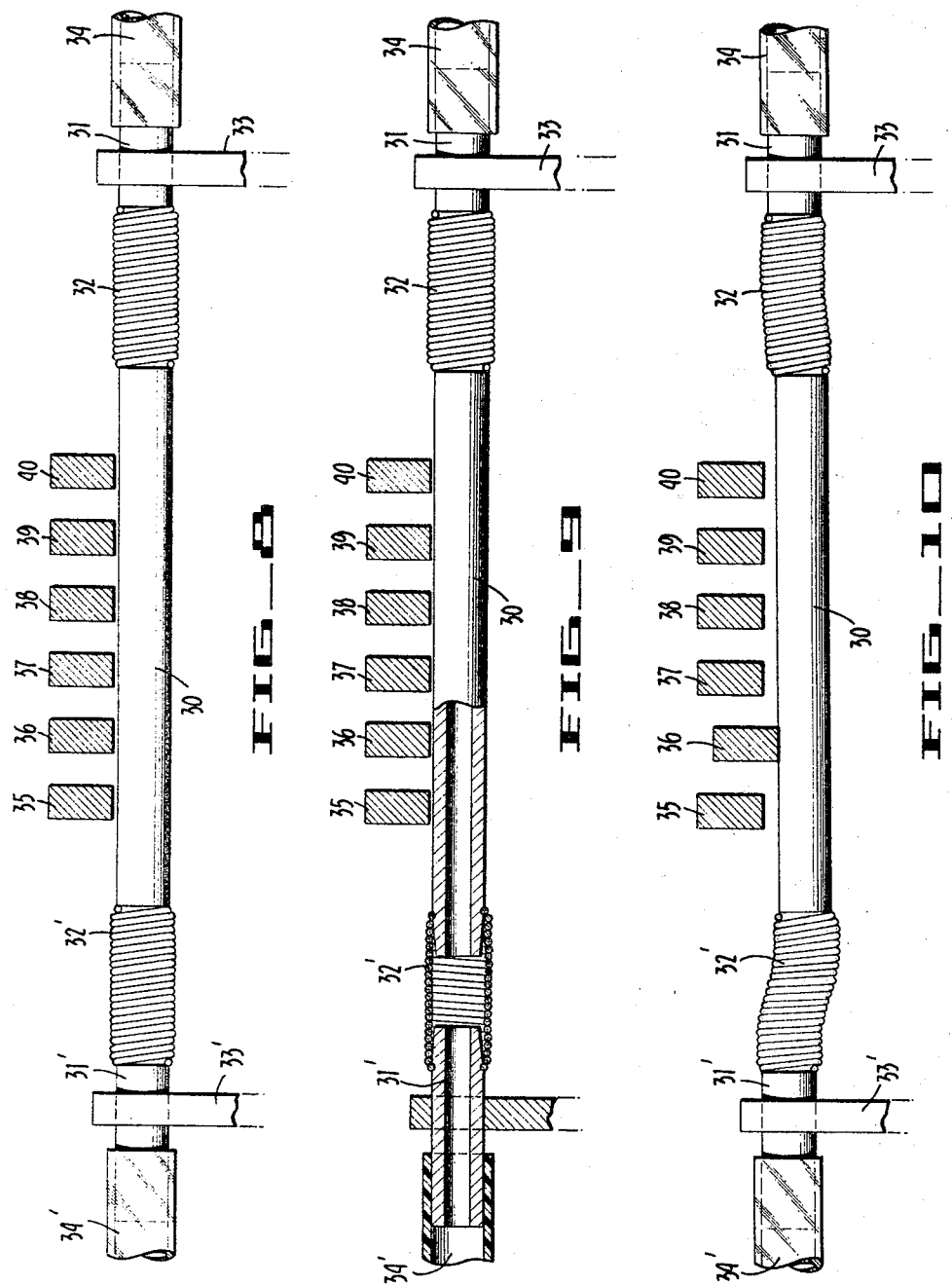

United States Patent Office 3,399,699
Patented Sept. 3, 1968

3,399,699
FLUID FLOW CONTROL VALVE
George B. Greene, Lafayette, Calif., assignor to Green Engineering Company, a corporation
Filed Sept. 21, 1964, Ser. No. 397,988
2 Claims. (Cl. 137—637)

ABSTRACT OF THE DISCLOSURE

A fluid flow control system utilizing a fluid-tightly wound spring which may be flexed by mechanical means to open the turns of the spring, thereby permitting fluid flow between the spring's interior and exterior. A perforated paper tape reader and a bail valve utilizing the fluid-tightly wound spring is also shown and described.

---

This invention relates to valves of the kind employed to control the flow of fluids.

In the data processing, business machine, process control, and like arts valves are employed to control fluid flows which convey information, or provide power to operate or control data recording devices, data reading devices, tools, and the like. As employed in business data processing machines, for instance, a plurality of fluid control valves used to control the flow of fluid in a corresponding plurality of data channels may be comprised of orifices in a tracker bar each adapted to coact with a channel of a punched paper tape, the holes in each channel of the tape serving to open the corresponding data channel to ambient atmosphere, and thereby converting information from the tape to an associated typewriting mechanism in the manner shown in United States Patent No. 2,247,275. Alternatively, the information-carrying holes in punched tape may be sensed by star wheels, or fingers, the star wheels or fingers being employed to actuate fluid control valves associated with data channels. In addition, it has been suggested that combinations of fluid valves, coordinated by intermediate linkage mechanisms, be used to carry out "logical decisions" and control functions in business data processing devices. In such applications it is necessary that the fluid valves employed be rugged and capable of long service life without maintenance. It is also desirable that such fluid valves be actuable by small forces acting through short distances in order that tape perforations may be sensed with minimum adverse effect upon the tape holes, minimum deflection of bails, and the like, located internally of business machines may be positively detected, etc. Also, it is desirable that perforations in cards, tape, and the like, be detectable without ingestion of the dust characteristically found at the periphery of punched holes into an associated fluid-operated data processing and control system.

It is therefore an object of the instant invention to provide a fluid control valve consisting of a minimum number of parts, all of which are rugged and capable of providing long service life substantially without maintenance.

Another object of the instant invention is to provide a fluid valve actuable by small forces acting through small distances.

Yet another object of the instant invention is to provide a fluid control valve capable of being actuated by such small forces as to make it possible to sense the holes in punched tape many times over without substantial wear.

A further object of the instant invention is to provide a valve which may be incorporated into a bail mechanism whereby to control a fluid flow in response to minimum deflections of the bail.

An additional object of the instant invention is to provide a fluid valve which is more compact than fluid valves of the prior art.

A further object of the instant invention is to provide a fluid valve which may be actuated by diverse types of mechanical motions without alteration of the valve structure.

Still another object of the instant invention is to provide a fluid valve adaptable for actuation by electromagnetic, piezoelectric, and other diverse actuation means without substantial alteration of the valve mechanism.

Another object of the instant invention is to provide a fluid valve which is adaptable to the sensing of information from input media, the sensing of the position of translator bars, bails, cams, etc., and the carrying out of "logical decisions," substantially the same valve structure being used in each of these cases.

Yet another object of the instant invention is to provide a valve capable of being opened by small displacements of its actuator, and yet, at the same time, immune to damage by displacements of its actuator many times greater than the minimum displacement necessary to operate the valve.

An additional object of the instant invention is to provide a valve having an actuator capable of opening the valve independently of the direction in which the actuator is displaced.

Still another object of the instant invention is to provide a valve having an actuator which may be displaced along noncodirectional lines of action by a plurality of displacing means, said actuator opening said valve when operated by any single one of said deflecting means, or any combination thereof.

Other objects of the invention will, in part, be obvious, and will, in part, appear hereinafter.

The invention, accordingly, comprises the features of construction, combinations of elements, and arrangements of parts, which will be exemplified in the constructions hereinafter set forth. The scope of the invention will be indicated in the claims.

For a fuller understanding of the nature and objects of the invention reference should be had to the following detailed description, taken in connection with the accompanying drawings, in which:

FIG. 1 represents a particular type of valve embodying the invention;

FIG. 2 is a cutaway view of the embodiment of FIG. 1, the embodiment shown in FIGS. 1 and 2 being represented in its unflexed, or closed, state;

FIG. 3 shows the embodiment illustrated in FIGS. 1 and 2 in its flexed, or open, state;

FIG. 4 illustrates an alternative method of actuating an embodiment of the instant invention of the particular type shown in FIGS. 1 through 3;

FIG. 5 illustrates an application of the instant invention to the reading of perforated cards, tape, or the like;

FIGS. 6 and 7 show an alternative form of the instant invention, FIG. 7 illustrating the device shown in FIG. 6 in cutaway;

FIG. 8 represents yet another embodiment of the instant invention wherein a pair of valve mechanisms, according to the instant invention, are incorporated with a bail arranged to be actuated by transverse bars;

FIG. 9 illustrates the device of FIG. 8 in partial section; and

FIG. 10 illustrates the device shown in FIG. 8 when the valve mechanism according to the invention is in its flexed, or open, state due to the deflection of the bail.

A particularly effective and simply constructed embodiment of the instant invention is shown in FIGS. 1 through 3. Generally, this embodiment of the instant invention comprises three parts: the stem 1, the coil 2, and the plug 3. Stem 1 may be fixedly mounted by any desirable means (not shown) which, for instance, is adapted to grippingly embrace the exposed portion of the stem lying between the end of coil 2 and the end of the associated pipe, or duct, 4. Pipe, or duct, 4 is herein illustrated as a transparent tubing, such as flexible, transparent polyethylene tubing, which may conveniently be used in fabricating systems employing the fluid valves of the invention. It will be apparent to those skilled in the art upon reading the instant disclosure, however, that a wide range of tubing, piping, or duct constructions may suitably be employed in conjunction with the instant invention. Also, many possible manners of joining such tubing, or ducting, to the stem of the device of the instant invention will be apparent to those skilled in the art.

Coil 2, which constitutes a principal feature of the instant invention, is illustrated in connection with the embodiment shown in FIGS. 1 through 3 as a tightly wound cylindrical coil spring. The present invention, however, is not limited to the embodiment of FIGS. 1 through 3. To the contrary, the coil, or coils, which may be employed in practicing the instant invention may take entirely different geometrical forms, as, for instance, the trunco-conical form employed in the embodiment shown in FIGS. 6 and 7. Alternatively, resilient coils of non-regular cylindrical, or conical, form, or of any geometry suitable to a particular application of the instant invention may be employed in carrying out the instant invention, and all such geometries are embraced by the instant invention. Generally, then, the geometry of the particular tightly-wound, resilient coil employed in carrying out the invention does not constitute a limitation thereof. Thus, the expression "tightly-wound spring" as used herein is limited to no particular geometry, except that the spring employed, of whatever geometry, has its turns disposed in such tightly abutting configuration as to form a substantially fluid-tight wall when in its undistorted, or unflexed, condition. Similarly, the expression "tight coil," or "fluid-tight coil," as used herein is independent of geometry, or configuration. Thus, expressions such as "fluid-tight spring," "tightly-wound spring," "resilient, tightly-wound coil," "flexible, fluid-tight coil," and the like, as used herein, are employed in their broadest acceptation to designate any convoluted, resilient body having tightly abutting convolutions adapted to significantly impede the passage of fluid between them except when said body is stressed, i.e., to impede the passage of fluid therebetween only when said body is relaxed. The expression "significantly impede" as used herein means to impede sufficiently that the resulting valving action at least produces distinguishable digital signals.

As may be seen in FIG. 2, resilient, fluid-tight coil 2 is joined to stem 1 and plug 3 by means of particularly simple and efficacious adhesive-free joints. These joints are the subject of copending U.S. patent application Ser. No. 404,320, filed Oct. 16, 1964 by Arne M. Sylt, now abandoned, and do not form a part of the instant invention. Alternative means for joining coil 2 to stem 1 and plug 3 will be apparent to those having ordinary skill in the art.

Plug 3, joined in a fluid-tight manner to the right-hand end of coil 2, serves to seal the right-hand end of coil 2 to form a fluid-tight chamber therewithin when coil 2 is in its unflexed, or relaxed, state. Plug 3 also includes, either as an integral part or as a separate part joined to it, actuator 5, by means of which flexing, or distorting, forces may be applied to open coil 2 in the manner illustrated in FIGS. 3 and 4 and described hereinbelow.

As may further be seen in FIG. 2, stem 1 and plug 3 coact with coil 2 to form a significantly fluid-tight chamber when actuator 5 is undeflected and, thus, coil 2 is relaxed. Stem 1 provides fluid communication means, via passage 6, to chamber 7 defined by coil 2, plug 3, and stem 1.

FIG. 3 illustrates the manner of operating, or opening, the fluid valve of the invention by applying deflecting force to actuator 5 by means of mechanical element 8, which may be, for instance, a bail, or translator bar, of the type used in mechanical printout means adapted to operate with business machines, or data processing systems. As further shown in FIG. 3, deflection of actuator 5 causes coil 2 to be opened in the sense that separation of its normally tightly abutting coils is brought about, thereby temporarily destroying the fluid-tight integrity of chamber 7 (FIG. 2) while actuator 5 remains deflected.

FIG. 4 illustrates an alternative manner in which actuator 5 may be deflected, and the associated valve according to the instant invention opened. In this embodiment a particular form of actuator 5' is used which is of such magnetic quality as to be attracted by the field produced at the gap in pole structure 10 in response to a control current in actuating coil 9.

As will be apparent to those having ordinary skill in the art, plug 3 may be deflected to flex coil 2, and thus open the valve of the invention, in many manners other than those indicated in FIGS. 3 and 4. For instance, actuator 3 may be made responsive to rotary cams, and the like, in addition to the bail-type actuator 8 shown in FIG. 3. Actuator 5 may be made responsive to deflecting forces produced by piezoelectric means, pneumatic means, hydraulic means, and the like. Generally, the particular means employed to deflect actuator 5, or any of its equivalent forms, is not a limitation of the instant invention.

A particular application of the instant invention is shown in FIG. 5. The device of FIG. 5 may, for instance, be employed in conjunction with the automatic motorized typewriter shown in United States Patent No. 2,247,275, and will be described in connection therewith by way of example.

Before considering the specific mechanism shown in detail in FIG. 5, it should be recognized that the structure of FIG. 5 constitutes a reader for one channel of perforated tape 14, the reader for the other channels of tape 14 being suitably juxtaposed to the structure shown in FIG. 5 so as to coact with their associated channels of perforated tape 14.

Going, then, to the single channel reader shown in FIG. 5, it may be seen that the various elements of this single channel reader are disposed upon a wall, or partition, 11, which is, in turn, located within and supported by a housing 12. Housing 12 supports and contains the walls, or partitions, corresponding to 11, which support the mechanism of each single channel reader corresponding to each channel of perforated tape 14. Located generally below housing 12, there is disposed a shelf 12' which coacts with housing 12 and the lower edges of partition 11 and the corresponding partitions of the other channel readers to form a slot 13 wherein perforated tape 14 is disposed for travel longitudinally of housing 12. Facile manners of insertion of tape 14 and maintaining tape 14 within slot 13, such as, for instance, the use of a sprocket adapted to coact with a central row of uniformly distributed sprocket holes in tape 14, are well known to those having ordinary skill in the art and will not be described or shown herein.

Drum 15, shown in FIG. 5 mounted upon shaft 22, may be used as such a sprocket by being equipped with sprocket teeth adapted to coact with the sprocket holes in perforated tape 14. Alternatively, drum 15 may be provided with a surface adapted to frictionally engage the perforated tape, in which case a roller may, for instance, be mounted directly below shaft 22 in shelf 12', tape 14 passing between said roller (not shown) and drum 15. Other manners of transporting perforated tape 14 between housing 12 and shelf 12' will be employed by those having ordinary skill in the art as a matter of preferred choice.

Irrespective of the mode of tape transport employed, however, an arm 17 is provided which is pivoted at 18 and downwardly drawn by coil spring 19. Arm 17 is provided with protrusion 20 which is adapted to sense the holes in the corresponding channel of tape 14 and to maintain itself in a relatively upward position until protrusion 20 falls into a hole in the tape, such as hole 21 shown in FIG. 5.

The upper end of arm 17 is provided with a hole, or slot, closed at its upper end through which the outer portion of actuator 5 of a fluid valve according to the instant invention, is disposed. This valve comprises stem 1, coil 2, and plug 3, as hereinabove described. Stem 1 is maintained fixedly positioned with respect to partition 11 by means of clip 16. Clip 16 also functions to position the fluid valve 1, 2, 3, 5 in a position sufficiently spaced from partition 11 to permit coil 2 to be flexed by downward pressure of arm 17 upon actuator 5 without binding between any of these parts and partition 11.

Duct 5 extends from the end of stem 1 remote from coil 2, and is bent sufficiently to pass through hole 23, whereafter it is routed to an interponent actuating mechanism in the manner which will be understood by reference to the Buckley patent, No. 2,247,275, referred to hereinabove (hereinafter called "Buckley")

As will be apparent to those skilled in the art from examination of FIG. 5, the length and proportioning of lever 17, the length and proportioning of protrusion 20, and the location of valve 1, 2, 3, 5 are so chosen that the presence of a thickness of tape stock between protrusion 20 and shelf 12' will sufficiently elevate lever 17 as to dispose actuator 5 in its normal, or valve closed, position for that purpose. On the other hand, the presence of a tape hole, such as 21, permitting protrusion 20 to drop to shelf 12', and lever 17 to draw actuator 5 downwardly, will spread adjacent turns of coil 2, thereby opening the fluid valve to the ambient atmosphere within housing 12.

Thus, it may be seen that the single channel reader shown in FIG. 5 responds to perforation, or lack of the same, as follows: the presence of a perforation in tape 14 at protrusion 20 causes the turns of coil 2 to be spread, thereby opening duct 4 to substantially ambient pressure; while the presence of the tape web at protrusion 20 causes coil 2 to be returned to its unflexed, or closed, condition, thereby closing duct 4 to ambient atmospheric pressure.

As will be apparent to those having ordinary skill in the art, the mechanism of FIG. 5, in its overall operation, functions to produce the same results as the direct hole reader shown in Buckley. That is to say, in FIG. 5, as in Buckley, the presence of a perforation at the reading position brings about an open valve condition in the corresponding information channel; while, again as in Buckley, the presence of tape web at the reading position causes a closed valve condition.

Thus, as will be apparent to those skilled in the art, a mechanism such as shown in FIG. 5 embodying the instant invention, may be substituted for each one of the holes $g_1$ in tracker bar $g$ of Buckley, the means of mutually disposing the valves, levers, pivots, etc., of these several single channel readers to permit of such substitution being a matter within the skill of the ordinary mechanic in the art. In so doing, of course, the ducts 4 corresponding to each information channel will be connected to ducts $g^4$ of Buckley (FIG. 3), and power from shaft 69 of Buckley (FIG. 3) will be used to drive drum 15, shaft 22 as shown in FIG. 5 becoming a stub end of shaft 69 of Buckley.

The substitution, by means of the mechanism of FIG. 5, of the fluid valve of the invention for the direct valving method of Buckley solves the problem characteristic of such direct valve systems of sufficient amounts of "dust" from the edges of perforations being drawn into the system as will ultimately clog the ports of the associated air motors (Buckley, FIG. 22) and pumps. More modern systems than that of Buckley, comprising more air motors, valves, and the like, and more heavily loading the associated pumping systems, will be characterized by more sensitivity to the effects of "perforation dust," and the advantages provided by the valve of the instant invention when utilized as shown in FIG. 5 will be more marked.

The above application of the fluid valve of the invention described in connection with FIG. 5 is merely exemplary and by no means indicative of the wide scope of application of the fluid valve of the instant invention. For example, the application of the invention described in connection with FIG. 5 comprises a vacuum system, whereas the valve of the invention is not limited in its usefulness to any particular fluid or gas.

Shown in FIGS. 6 and 7 is an alternative embodiment of the fluid valve of the invention employing a coil of different geometry from that described above for use in applications wherein a valve capable of supporting itself upon its own base and a low profile is desired. Such an application might be, for instance, one in which a plurality of the valves of the invention, all mounted upon a common mounting plate, are linked together by one or more slidable plates, each of said plates having a parti-stellate hole coacting with the actuator of each of said valves. The displacement of one of said plates along the common direction of one of the sets of rays of its stellate holes would result in opening those valves whose corresponding stellate holes have missing rays, and not opening those valves whose corresponding holes have rays extending in said common direction. Thus, a single one of such code plates having parti-stellate holes of eight rays may be employed to actuate an associated plurality of the valves of the invention in any one of a selection of eight unique combinations determined by direction of displacement of the code plate as a whole.

Elements 24, 25, 26, 27, and 28 correspond functionally to elements 1, 2, 3, 4, and 5 of FIGS. 1 through 3 as described in detail hereinabove. It will be recognized by those skilled in the art that, if desired, plug 26 may be dispensed with by winding coil 25 to an apex at which a "pigtail" may protrude to act as a substitute for actuator 28. Cylindrical springs may, of course, be similarly configured.

The application of the embodiment of the instant invention shown in FIGS. 6 and 7 described hereinabove in connection with code plates having parti-stellate holes is merely exemplary, and is by no means illustrative of the broad scope of application of the embodiment of the instant invention shown in FIGS. 6 and 7.

Reference is now had to FIGS. 8 through 10 which show another invention embodying the principles of the hereinbefore described invention which is particularly useful in data processing machines and office machines of the class referred to hereinabove.

This invention is shown in its unactuated state in FIGS. 8 and 9, FIG. 9 being cutaway in one portion to show an exemplary arrangement of coacting parts and fluid channels within tubular members 30 and 31'. FIG. 10 shows the same device according to this invention in its actuated state.

This invention, in its various forms, is called a "bail valve" because each of its various forms is characterized by a longitudinal bar, or tube, adapted to be transversely displaced, and thereby to open one or both of the fluid-tight, resilient coil member 32 and 32'. This bar, or tube, 30, hereinafter called the "bail," is disposed in the normal use of this invention adjacent one or more transverse bars, cams, or the like, in such manner, as shown in FIG. 10, that displacement of one or more of these bars, cams, etc., will displace bail 30 sufficiently to open or deflect at least one of the valve coils 32, 32'.

As will be appreciated by those skilled in the art upon reading the instant specification and drawings, bail 30 may be hollow, as is shown in FIG. 9, or solid, according to the nature of the particular application of the instant invention. Similarly, either stem 31 or stem 31' may be solid, rather than having a bore passing therethrough. Such embodiments will be employed, of course, in those applications wherein the travel of displacing members 35 through 40 is sufficient to assure that the requisite one, or both, of coils 32, 32′, is sufficiently flexed to positively open it.

In another embodiment of this invention bail 30 may be solid, or plugged, in whole, or in part, *and* either stem 31 or stem 31′ may be solid, or plugged. In this case one of the normally fluid-tight, resilient coils 32, 32′ will not act as a valve, or will be "dead" and merely serve as a relatively free suspension for the other end of bail 30 from the "live" valve coil.

As will be apparent to those skilled in the art, coils 32 and 32′ function in a manner analogous to coil 2 of FIG. 1, stems 31 and 31′ function, when hollow, in a manner analogous to stem 1 of FIG. 1, ducts 34 and 34′ function in the manner analogous to duct 4 of FIG. 1, and bail 30 functions in a manner analogous to plug 3 and actuator 5 of FIG. 1. Support members 33 and 33′ in FIGS. 8 through 10 serve merely to fixedly position stems 31 and 31′ with respect to each other, and with respect to the device in which the bail valve is employed.

The above-described application of the bail valve invention shown in FIGS. 8 through 10 is merely exemplary, and in no way embraces the many applications in which this invention may be advantageously employed.

It will be appreciated that, by the above-described constructions, a fluid control valve is provided which consists of a minimal number of parts, viz., a tightly-wound spring member which is substantially fluid-tight in its unstressed condition and means joined to such spring member and defining therewith a chamber which is substantially fluid-tight when said spring member is unflexed, said means being adapted to perform any or all of the functions of supporting said spring member, flexing said spring member, of providing access to said chamber for operating fluids to be controlled by the valve. It will also be appreciated that the parts of the valve of the invention are all rugged and capable of providing long service life substantially without maintenance; the valve of the invention at the same time being actuable by small forces acting through small distances, said forces being provided by diverse types of mechanical motions, electrical and fluid pressure devices, etc., without substantial alteration of the compact valve structure of the invention. Additionally, it will be appreciated that the fluid control valve structure of the invention is capable of being embodied in many diverse forms in which it is adaptable to efficiently carry out many highly diverse functions while at the same time occupying little space in critically congested areas of complex mechanisms, such as business machines, data processing devices, and the like; examples of such diverse forms being the bail valve of FIGS. 8 through 10 and the self-supporting "pancake" form of valves shown in FIGS. 6 and 7.

It will thus be seen that the objects set forth above, among those made apparent from the preceding description, are efficiently attained, and, since certain changes may be made in the above constructions without departing from the scope of the invention, it is intended that all matter contained in the above description, or shown in the accompanying drawings, shall be interpreted as illustrative, and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A bail valve comprising an elongated bail supported at its ends by coil springs, each of said springs including a plurality of turns defining a chamber, adjacent ones of said turns being normally resiliently biased in fluid-tight relation with each other, the ends of said coil springs opposite said bail being supported by support members at least one of which provides fluid communication to at least the one of said chambers adjacent it.

2. A bail valve comprising:
 a pair of fluid-tightly wound coil springs, each of which define internal fluid chambers;
 a spring-deflecting member having opposite ends;
 respective ones of said springs having one end affixed to respective opposite ends of said member;
 spring support means engaged with the other ends of said springs for maintaining said other ends of said springs in relatively fixed relation with each other;
 at least one of said support means providing operating fluid access to at least the one of said chambers adjacent it.

References Cited

UNITED STATES PATENTS 2,638,925   5/1953   Monahan _____ 137—625.4
3,125,118   3/1964   Zeisloft _____ 137—525.1

FOREIGN PATENTS 345,449   12/1921   Germany.

WILLIAM F. O'DEA, *Primary Examiner.*

W. H. WRIGHT, *Assistant Examiner.*